(12) United States Patent
Chang et al.

(10) Patent No.: US 12,110,374 B2
(45) Date of Patent: Oct. 8, 2024

(54) RECYCLABLE CROSSLINKED POLYMERIC FOAM AND APPLICATIONS THEREOF

(71) Applicant: USI Corporation, Kaohsiung (TW)

(72) Inventors: Yung-Shen Chang, Kaohsiung (TW); Chun-Fan Hsieh, Kaohsiung (TW); Yu-Hsiang Lin, Kaohsiung (TW)

(73) Assignee: USI Corporation, Kaohsiung (TW)

( * ) Notice: Subject to any disclaimer, the term of this patent is extended or adjusted under 35 U.S.C. 154(b) by 208 days.

(21) Appl. No.: 17/582,508

(22) Filed: Jan. 24, 2022

(65) Prior Publication Data

US 2023/0235143 A1 Jul. 27, 2023

(51) Int. Cl.
| | |
|---|---|
| C08J 9/00 | (2006.01) |
| A43B 13/04 | (2006.01) |
| A43B 17/00 | (2006.01) |
| C08J 9/06 | (2006.01) |
| C08J 9/10 | (2006.01) |
| C08J 9/12 | (2006.01) |

(52) U.S. Cl.
CPC ............ *C08J 9/0023* (2013.01); *A43B 13/04* (2013.01); *A43B 17/003* (2013.01); *C08J 9/0028* (2013.01); *C08J 9/103* (2013.01); *C08J 9/104* (2013.01); *C08J 2201/026* (2013.01); *C08J 2203/04* (2013.01); *C08J 2331/04* (2013.01)

(58) Field of Classification Search
CPC ........ C08J 9/0023; C08J 9/0028; C08J 9/103; C08J 9/104; C08J 2201/026; C08J 2203/04; C08J 2331/04; C08J 2201/032; C08J 2203/06; C08J 2203/08; C08J 2300/30; C08J 9/122; C08J 2400/30; C08J 9/0061; C08J 2323/06; C08J 2323/08; C08J 2423/08; C08J 9/102; C08J 9/105; C08J 9/12; C08J 2323/00; A43B 13/04; A43B 17/003; A43B 1/0063; A43B 1/10; A43B 1/12; C08K 5/14; C08K 5/3432; C08K 5/0025; Y02W 30/62; C08L 23/0853; C08L 23/16
See application file for complete search history.

(56) References Cited

FOREIGN PATENT DOCUMENTS

| | | |
|---|---|---|
| CN | 111247201 A | 6/2020 |
| EP | 1 942 152 A1 | 7/2008 |
| TW | V201020305 A1 | 6/2010 |
| WO | WO 2009/085814 A2 | 7/2009 |

OTHER PUBLICATIONS

Chaudhary et al., "Thermoreversible crosslinking of polyethylene enabled by free radical initiated functionalization with urethane nitroxyls", Polymer, vol. 51, 2010 (Available online Nov. 26, 2009), pp. 153-163.
Extended European Search Report dated Jul. 27, 2022 for Application No. 22158358.6.
Taiwanese Office Action and Search Report dated May 9, 2023 for Application No. 111122434.

*Primary Examiner* — K. Boyle (74) *Attorney, Agent, or Firm* — Birch, Stewart, Kolasch & Birch, LLP (57) ABSTRACT

A recyclable crosslinked polymeric foam includes a reaction product of 0.1 to 10 parts by weight of a crosslinking agent and 0.1 to 5 parts by weight of a radical initiator, based on 100 parts by weight of a polymeric material. The crosslinking agent is represented by the following formula:

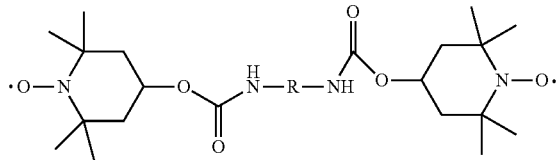

wherein R is an alkylene group having 2 to 10 carbon atoms, an arylene group having 6 to 18 carbon atoms, or a cycloalkylene group having 6 to 18 carbon atoms.

18 Claims, 2 Drawing Sheets

RECYCLABLE CROSSLINKED POLYMERIC FOAM AND APPLICATIONS THEREOF

TECHNICAL FIELD

The disclosure relates to a recyclable crosslinked polymeric foam, a reusable footwear component employing the same, and a reversed material obtained therefrom.

BACKGROUND

EVA (Ethylene Vinyl Acetate) foam is a commonly used material for the midsoles of footwear since it is light-weight and provides ideal cushioning properties. However, it does have a reputation for lacking durability. To enhance durability, EVA foam is highly crosslinked which makes it unrecyclable, resulting in a large amount of waste. Although alternative raw materials such as TPU (Thermoplastic Polyurethane) are renewable, there are drawbacks such as the high cost of raw materials and equipment replacements.

Despite the fact that existing EVA foams have been adequate for their intended purposes, they have not been entirely satisfactory in all respects. In particular, there are still unmet needs for the EVA foams with recyclability and suitable properties that allow for their further utilization in the footwear industry and other fields.

SUMMARY

In accordance with one embodiment of the disclosure, a recyclable crosslinked polymeric foam is provided. The recyclable crosslinked polymeric foam includes a reaction product of 0.1 to 10 parts by weight of a crosslinking agent and 0.1 to 5 parts by weight of a radical initiator, based on 100 parts by weight of a polymeric material. The crosslinking agent is represented by the following formula:

wherein R is an alkylene group having 2 to 10 carbon atoms, an arylene group having 6 to 18 carbon atoms, or a cycloalkylene group having 6 to 18 carbon atoms.

In accordance with one embodiment of the disclosure, a reusable footwear component is provided. The reusable footwear component includes the above-mentioned recyclable crosslinked polymeric foam, wherein the yellow index of the recyclable crosslinked polymeric foam is between −5 and 70.

In accordance with one embodiment of the disclosure, a reversed material obtained from the above-mentioned reusable footwear component is provided, wherein the yellow index of the reversed material is between −5 and 95.

BRIEF DESCRIPTION OF THE DRAWINGS

The disclosure can be fully understood by reading the subsequent detailed description and examples with references made to the accompanying drawings, wherein.

DETAILED DESCRIPTION

The recyclable polymeric composition, polymeric foam, the reusable footwear component employing the same, and the reversed material obtained therefrom of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments.

At present, the EVA foams are generally not recyclable. Besides, during repeated thermal processing of recycled foam materials, yellowing may occur, which may limit further applications. If the recycled foam material is not in white color, the resulting product can only be in dark color such as black or brown. To address the above issues, the present application introduces a thermally degradable urethane linkage into EVA systems by the use of a TEMPO derivative, providing a recyclable crosslinked polymeric foam with desirable properties such as a low yellow index.

In accordance with some embodiments of the disclosure, the present recyclable crosslinked polymeric foam (e.g., EVA foam) includes a polymeric material, a crosslinking agent (i.e., a TEMPO derivative) and a radical initiator. By using specific crosslinking agent and controlling the ratio between the proportion of the radical initiator, the crosslinking agent and the polymeric material during a foaming process, desirable properties can be obtained. This results in high crosslinking efficiency and recyclability, as well as unexpectedly low yellow index of the polymeric and its reversed material, providing flexibilities for further applications such as dyeable substrates, footwear, athletic equipment, and furniture.

In some other embodiments, the polymeric composition provided by the disclosure may also be used as an encapsulant in photovoltaic modules. A decrease of transparency of the encapsulant may cause the loss of electric efficiency of the photovoltaic modules. By tuning the color of the encapsulant, the degree of light transmittance and the solar photovoltaic conversion efficiency can be adjusted. Therefore, with lower yellow index, better solar photovoltaic conversion efficiency may be achieved.

In accordance with some embodiments of the disclosure, a recyclable crosslinked polymeric foam is provided. The recyclable crosslinked polymeric foam includes a reaction product of 0.1 to 10 parts by weight of a crosslinking agent and 0.1 to 5 parts by weight of a radical initiator, based on 100 parts by weight of a polymeric material. The crosslinking agent is represented by the following formula:

wherein R is an alkylene group having 2 to 10 carbon atoms, an arylene group having 6 to 18 carbon atoms, or a cycloalkylene group having 6 to 18 carbon atoms.

In accordance with some embodiments of the disclosure, the polymeric material may be a polyolefin polymer, a propylene polymer, a polyethylene polymer, a styrene polymer, an ethylene-based polymer such as an ethylene-vinyl acetate (EVA), low-density polyethylene (LDPE), linear-low-density polyethylene (LLDPE), very-low-density polyethylene (VLDPE), and high density polyethylene (HDPE), a diene-based rubber such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), ethylene propylene rubber (EPR) and ethylene-propylene-diene rubber (EPDM)), or a combination thereof. Each of the abovementioned polyolefin polymer, propylene polymer, polyethylene polymer, styrene polymer and ethylene-based polymer includes random, block and graft copolymers thereof. Examples of polyolefin polymers include olefin block copolymers (OBCs). Examples of propylene polymers include propylene ethylene copolymers. In particular, the polymeric material may be ethylene-propylene-diene (EPDM) rubber, a natural rubber (NR), an isopropylene rubber (IR), or a combination thereof.

In some embodiments, the ethylene-based polymer may be an LDPE. LDPEs are generally highly branched ethylene homopolymers, and can be prepared via high pressure processes (i.e., high-pressure LDPE). LDPEs suitable for use herein may have a density ranging from 0.91 to 0.94 g/cm$^3$. In some embodiments, the ethylene-based polymer is a high-pressure LDPE having a density of at least 0.915 g/cm$^3$, but less than 0.94 g/cm$^3$, or less than 0.93 g/cm$^3$. Polymer densities provided herein are determined according to ASTM International ("ASTM") method D792. LDPEs suitable for use herein may have a melt index of less than 40 g/10 min., or ranging from 0.1 to 400 g/10 min., or from 0.5 to 20 g/10 min., or from 0.5 to 5 g/10 min., or from 1 to 3 g/10 min., or a melt index of 2 g/10 min. Melt indices provided herein are determined according to ASTM method D1238. Unless otherwise noted, melt indices are determined at 190° C. and 2.16 kg. Generally, LDPEs have a broad molecular weight distribution resulting in a relatively high polydispersity index (PDI; ratio of weight-average molecular weight to number-average molecular weight).

In some embodiments, the ethylene-based polymer may be an LLDPE. LLDPEs are generally ethylene-based polymers having a heterogeneous distribution of comonomer (e.g., α-olefin monomer), and are characterized by short-chain branching. For example, LLDPEs may be copolymers of ethylene and α-olefin monomers, such as those described above. LLDPEs suitable for use herein may have a density ranging from 0.916 to 0.925 g/cm$^3$. LLDPEs suitable for use herein may have a melt index ranging from 0.1 to 400 g/10 min., 1 to 20 g/10 min., or from 3 to 8 g/10 min.

In some embodiments, the ethylene-based polymer may be a VLDPE. VLDPEs may also be known in the art as ultra-low-density polyethylenes (ULDPE). VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein may have a density ranging from 0.87 to 0.915 g/cm3. VLDPEs suitable for use herein may have a melt index ranging from 0.1 to 400 g/10 min., 0.1 to 20 g/10 min., or from 0.3 to 5 g/10 min.

In some embodiments, the ethylene-based polymer may be an HDPE. HDPE has a low degree of branching and thus stronger intermolecular forces and tensile strength. HDPE suitable for use herein may have a density ranging from 0.941 to 0.965 g/cm3. HDPEs suitable for use herein may have a melt index ranging from 0.1 to 400 g/10 min., 0.5 to 65 g/10 min., or from 1 to 30 g/10 min.

In some specific embodiments, the ethylene-vinyl acetate polymers are commercially available under the trade name UE3312 and UE629 from the USI Corporation. The ethylene-vinyl acetate polymer suitable for use herein have a vinyl acetate content of 3 to 45% by weight and a melt index of 0.01 to 400 g/10 min.

In some specific embodiments, polyolefin elastomers are commercially available under the trade name ENGAGE™ 8003 and ENGAGE™ 8180 from the Dow Chemical. Polyolefin elastomers suitable for use herein can have a density ranging from 0.857 g/cm$^3$ to 0.908 g/cm$^3$. Polyolefin elastomers suitable for use herein can have a melt index ranging from 0.1 to 400 g/10 min., or from 0.1 to 10 g/10 min. In some embodiments, the olefin block copolymer has an average melt index in the range of greater than 0.5 g/10 min and less than 35 g/10 min. The melt index is determined at 190° C., 2.16 kg according to ASTM D1238.

An isocyanate compound can be used in combination with a TEMPO compound to form a TEMPO derivative containing a thermally-reversible urethane bond. Suitable isocyanate compounds are polyfunctional isocyanates containing two or more than two —NCO groups per molecule. These can be aliphatic, cycloaliphatic, polycyclic or aromatic in nature such as diisocyanate compounds or triisocyanate compounds. In some embodiments, diisocyanate compounds may be toluene diisocyanate (TDI), methylene diphenyl diisocyanate (MDI), hexamethylene diisocyanate (HDI), 4,4'-diisocyanato dicyclohexylmethane (HMDI), xylene diisocyanate (XDI), meta-tetramethylxylylene diisocyanate (TMXDI), hydrogenated xylene diisocyanate (HXDI), naphthalene 1,5-diisocyanate (NDI), pphenylene diisocyanate (PPDI), 3,3'-dimethyldiphenyl-4, 4'-diisocyanate (DDDI), 2,2,4-trimethylhexamethylene diisocyanate (TMDI), isophorone diisocyanate (IPDI), 4,4'-dicyclohexylmethane diisocyanate, norbornane diisocyanate (NDI), or 4,4'-dibenzyl diisocyanate (DBDI).

In some other embodiments, triisocyanates may be triphenylmethane-4,4',4"-triisocyanate, 1,6,11-undecane triisocyanate, 1,3,6-hexamethylene triisocyanate, 1,8-diisocyanato-4-isocyanatomethyloctane, 2,5,7-trimethyl-1,8-diisocyanato-5-isocyanato methyloctane, lysine triisocyanate, mesitylene triisocyanate, trimethylbenzene triisocyanate, benzene triisocyanate, triphenylmethane triisocyanate, naphthalene triisocyanate, diphenylmethane-2,4, 4'-triisocyanate, or 3-methyldiphenylmethane-4,6,4'-triisocyanate.

In accordance with an embodiment of the disclosure, the crosslinking agent includes diisocyanate urethane bis-TEMPO. The exemplary diisocyanate urethane bis-TEMPO includes 4,4'- diphenylmethane diisocyanate urethane bis-TEMPO or 4,4'-diisocyanato dicyclohexylmethane urethane bis-TEMPO. A recyclable crosslinked polymer can also be prepared by grafting hydroxy-tempo to the main chain of thermoplastic polymer to form a grafted polymer, followed by reacting the grafted polymer with diisocyanate (in mobile phase but not volatile) to form the next structure.

In some specific embodiments, TEMPO is commercially available from Tokyo Chemical Industry which may be used as received.

Suitable radical initiators include α-cumyl peroxyneodecanoate, acetyl cyclohexylsulfonyl peroxide, benzoyl peroxide, butyl 4,4-di(tert-butylperoxy) valerate, bis(alpha-t-butyl-peroxyisopropyl) benzene (BIBP), cumyl hydroperoxide, decanoyl peroxide, dicumyl peroxide, di(tert-butyl) peroxide, di(tert-amyl) peroxide, di(isopropylcumyl) peroxide, diisopropylbenzene monohydroperoxide, ethyl-3,3-di(tert-butylperoxy)butyrate, ethyl-3,3-di(tert-amylperoxy)butyrate, isopropylcumyl cumylperoxide, lauroyl peroxide, n-butyl 4,4-di(tert-butylperoxy)valerate, OO-tert-butyl-O-isopropylmonoperoxy carbonate, OO-tert-butyl-O-(2-ethylhexyl)monoperoxy carbonate, OO-tert-amyl-O-(2-ethylhexyl)monoperoxy carbonate, paramenthane hydroperoxide, tert-amyl peroxypivalate, tert-amyl peroxyneodecanoate, tert-amyl hydroperoxide, tert-amyl peroxy-2-ethylhexanoate, tert-amyl peroxy-3,5,5-trimethylhexanoate, tert-butyl hydroperoxide, tert-butyl cumyl peroxide, tert-butyl peroxybenzoate, tert-butyl peroxyacetate, tert-butyl peroxyisobutyrate, tert-butyl peroxymaleate, tert-butyl peroxypivalate, tert-butyl peroxyneodecanoate, tert-butyl peroxyisononanoate, tert-butyl peroxy-2-ethylhexanoate, tert-butyl peroxy-3,5,5-trimethylhexanoate, 1,1-di(tert-butylperoxy)cyclohexane, 1,1-di(tert-butylperoxy)cyclohexane, 1,1-di(tert-butylperoxy)-3,3,5-trimethylcyclohexane, 1,1-di(tert-amylperoxy)cyclohexane, 1,3-di(tert-butylperoxyisopropyl)benzene, 2,2-di(tert-butylperoxy)butane, 2,5-dimethyl-2,5-di(2-ethylhexanoylperoxy)hexane, 2,5-dimethyl-2,5-di(hydroperoxy)hexane, 2,5-dimethyl-2,5-di(benzoylperoxy)hexane, 2,5-dimethyl-2,5-di(tert-butylperoxy)hexane, 2,5-dimethyl-2,5-di(tert-butylperoxy)hex-3-yne, 2,2-bis(4,4-ditert-butylperoxycyclohexyl)propane, 3-hydroxy-1,1-dimethylbutylperoxyneodecanoate, 3,5,5-trimethylhexanoyl peroxide, t-butyl peroxy-2-thylhexyl monocarbonate, or a combination thereof, but the disclosure is not limited thereto.

In accordance with an embodiment of the disclosure, the radical initiator includes peroxide, such as dicumyl peroxide or bis-(tert-butylperoxy isopropyl) benzene peroxide (BIBP).

In accordance with some embodiments of the disclosure, the molar ratio of the radical initiator and the crosslinking agent may be within a range of 0.1 to 5; for example, from 0.5 to 4.5, from 1 to 4, from 1 to 3, from 1 to 2.5, or from 1 to 2. In particular, the molar ratio of the radical initiator and the crosslinking agent higher than 0.9 is desirable to provide suitable properties (such as yellow index) of the polymeric and reversed materials for further applications. In some specific embodiments, of the radical initiator and the crosslinking agent may be higher than 1.2. In accordance with some embodiments of the disclosure, the total of the radical initiator and the crosslinking agent may be 0.5 to 15 parts by weight, preferably 1 to 14 parts by weight, 2 to 12 parts by weight, 3 to 10 parts by weight, or 4 to 8 parts by weight, based on 100 parts by weight of the polymeric material. In particular, the molar ratio of the radical initiator and the crosslinking agent lower than 0.9 would lead to a high yellow index of the polymeric and reversed materials, which may limit further applications.

The recyclable crosslinked polymeric foam may be a foaming product of a chemical or a physical foaming process, in which chemical or physical blowing agents are used. This allows the resulting crosslinked foamed product to have a reduced weight and can display flexibility, excellent tear resistance, compression set resistance, impact absorptivity, abrasion resistance and designability. The chemical blowing agents include sulfonyl hydrazide compounds, azo compounds, and nitroso compounds. The sulfonyl hydrazide compounds are exemplified by barium azodicarboxylate, benzene-1,3-disulfonyl hydrazide, benzene sulfonyl hydrazide, p-toluene sulfonyl semicarbazide, p-toluenesulfonyl hydrazide, p,p'-oxybis(benzene sulfonyl hydrazide), 4,4'-oxybis(benzene sulfonyl hydrazide) (OBSH), and the like. The azo compounds are exemplified by azodicarbonamide, azobisformamide, azobisisobutyronitrile, diazoaminobenzene, 2,2'-azobis(2-cyanobutane), 2,2'-azobis(methylbutyronitrile), barium azodicarboxylate, and the like. The nitroso compounds are exemplified by N,N'-dinitrosopentamethylenetetramine, N,N'-dinitroso-N,N'-dimethylterephthalamide, and the like.

Examples of the physical blowing agents include hydrocarbons such as pentane, butane, and hexane, halogenated hydrocarbons such as methyl chloride and methylene chloride, fluorinated hydrocarbons such as trichlorofluoromethane, dichlorodifluoromethane, trichlorotrifluoroethane, chlorodifluoroethane, and hydrofluorocarbon, and gases such as carbon dioxide, nitrogen and air.

These products are supplied in various particle sizes to control bubble formation and foam density. The fraction of the blowing agent can vary within broad limits and depends, among other things, on the type of blowing agent, the polymer mixture used and the desired density of the foamed materials to be produced. The proportion of the blowing agent may be between 0.1 and 20 wt. %; for example, it may be from 5 to 15 wt. %, relative to the total weight of the foamable thermoplastic mixture. Useful blowing agents can include those commercially available under the trade name ADC (DONGIN SEMICHEM).

In addition to the components described above, the foamable thermoplastic mixture can also contain one or more additives. Examples of additives that may optionally be used are, scorch retardants, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, water tree retardants, electrical tree retardants, voltage stabilizers, a metal deactivators, or a combination thereof.

In accordance with one embodiment of the disclosure, a reusable footwear component is provided. The reusable footwear component includes the recyclable crosslinked polymeric foam, wherein the yellow index of the recyclable crosslinked polymeric foam may be between −5 and 70; for example, it may be between −2 and 70, between −2 and 60, between −2 and 55, between −1 and 50, between −1 and 45, between −1 and 40, between 0 and 35, between 0 and 30, between 0 and 25, between 0 and 20, between 0 and 15, between 0 and 10, or between 0 and 5. In particular, the yellow index of the recyclable crosslinked polymeric foam higher than 45 would limit areas of further application.

In accordance with one embodiment of the disclosure, a reversed material obtained from the reusable footwear component is provided, wherein the yellow index of the reversed material may be between −5 and 95; for example, it may be between −5 and 45, between −2 and 45, between 0 and 45, between 2 and 45, between 4 and 45, between 5 and 45, between 0 and 40, between 2 and 40, between 4 and 40, between 5 and 40, between 0 and 35, between 2 and 35, between 4 and 35, between 5 and 35, between 0 and 30, between 2 and 30, between 4 and 30, between 5 and 30, between 0 and 25, between 2 and 25, between 4 and 25, or between 5 and 25. In particular, the yellow index of the reusable footwear component lower than 45 is desirable to provide more options for design and operation in further applications.

In accordance with some embodiments of the disclosure, the density of the recyclable crosslinked polymeric foam is from 0.05 g/cm$^3$ to 0.8 g/cm$^3$. The foam cell size of the recyclable crosslinked polymeric foam is between 30 μm and 1 mm.

In some embodiments, the reusable footwear component includes an insole, a midsole or an outsole.

In order to make the above-mentioned and other objects, features, and advantages of the present disclosure more apparent and easy to understand, several specific examples are described in detail as follows. However, they are not intended to limit the invention in any way.

Evaluation of Properties of Polymeric Composition

Table 1 lists the materials used in the following examples.

TABLE 1

| Product code | Category | Supplier | Ingredients |
|---|---|---|---|
| DCP | Radical Initiator | EMPEROR Chemical | Dicumyl peroxide |
| Luperox 101XL45 | Radical Initiator | Arkema | 2,5-dimethyl-2,5-di(tert-butylperoxy)hexane |
| Perbutyl E | Radical Initiator | NOF Corporation | t-butyl peroxy-2-ethylhexyl monocarbonate |
| M crosslinker | Crosslinking agent | USI Corporation | 4,4'-diphenylmethane diisocyanate urethane bis-TEMPO |
| H crosslinker | Crosslinking agent | USI Corporation | 4,4'-diisocyanato dicyclohexylmethane urethane bis TEMPO |
| UE629 | Polymeric material | USI Corporation | Ethylene-vinyl acetate (EVA) copolymer |
| UE3312 | Polymeric material | USI Corporation | Ethylene-vinyl acetate (EVA) copolymer |
| NA112-27 | Polymeric material | USI Corporation | Low-density polyethylene (LDPE) |
| LL120 | Polymeric material | USI Corporation | Low-density polyethylene (LDPE) |
| Engage 8003 | Polymeric material | DOW Chemical | Polyolefin Elastomer (POE) |
| Engage 8180 | Polymeric material | DOW Chemical | Polyolefin Elastomer (POE) |

(I) Yellow Index (YI)

The yellow index was determined according to a standardized method ASTM E313 [D65/10] using a Colorimeter (HunterLab, Model: UltraScan VIS). YI is determined after the crosslinking process and the reverse heating process of the polymeric composition.

Example 1

100 parts by weight of UE3312, 6.46 parts by weight of M crosslinker, 2.22 parts by weight of DCP were added sequentially into a mixer (Brabender, Model: Plasti-Corder). After heating to 120° C., the mixing process was continued for 5 minutes at a rotational speed of 35 rpm until the polymeric composition was completely blended. Next, the polymeric composition was placed in a mold (of 0.4 mm thickness) and compressed at 2300 psi. Heat and compression were applied using a hydraulic compressor (Carver, Model: Monarch Series). The polymeric composition was left in the press for 15 minutes at a temperature of 180° C. Upon completion of the above procedure, the polymeric composition was then cooled down to room temperature and a film specimen with a consistent thickness was formed accordingly.

Examples 2-13

Examples 2-13 were performed in the same manner as in Example 1 except that the ingredients and contents of the polymeric material, specifier crosslinking agent and radical initiator listed in Tables 2 and 3 were substituted for those used in Example 1 to obtain film specimens. Next, the measurements of yellow index (YI$_{film}$) for Examples 1-13 were carried out, and the results are also shown in Table 2.

TABLE 2

|  | Ex. 1 | Ex. 2 | Ex. 3 | Ex. 4 | Ex. 5 | Ex. 6 | Ex. 7 |
|---|---|---|---|---|---|---|---|
| UE3312 (g) | 100 | 100 | 100 | 100 | 100 | 100 | 100 |
| M crosslinker (phr) | 6.46 | 6.42 | 4.28 | 6.42 | 4.28 | 4.28 | 4.28 |
| DCP (phr) | 2.22 | 3.33 | 3.33 | — | — | — | — |
| 101XL45 (phr) | — | — | — | 2.78 | 2.78 | — | — |
| Perb-E (phr) | — | — | — | — | — | 1.25 | 2.15 |
| m I/C | 0.79 | 1.11 | 1.66 | 0.39 | 0.58 | 0.68 | 1.18 |
| YI$_{film}$ | 41.9 | 40.6 | 6.7 | 53.1 | 49.7 | 44.6 | 23.3 |

Note:
(i) m I/C refers to molar ratio (Initiator mole/crosslinking agent mole)
(ii) YI$_{film}$ refers to the yellow index of the film specimen Referring to Examples 1-3, for which same type of peroxide (i.e., dicumyl peroxide) was added during the preparation. It was observed that unexpectedly lower $YI_{film}$ values were resulted from polymeric compositions with higher m I/C. This tendency can also be observed in Examples 4-5 and Examples 6-7, for which the types of peroxide added during the preparation were 2,5-dimethyl-2,5-di(tert-butylperoxy)hexane and t-butyl peroxy-2-ethyl-hexyl monocarbonate respectively. Therefore, a higher m I/C may be adopted in order to obtain a more preferable $YI_{film}$ (i.e. a lower YI value).

TABLE 3

|  | Ex. 8 | Ex. 9 | Ex. 10 | Ex. 11 | Ex. 12 | Ex. 13 |
|---|---|---|---|---|---|---|
| UE3312 (g) | 100 | 100 | 100 | 100 | 100 | 100 |
| H crosslinker (phr) | 6.42 | 4.28 | 4.28 | 5.38 | 4.28 | 4.28 |
| DCP (phr) | 3.33 | 3.33 | — | — | — | — |
| 101XL45 (phr) | — | — | 2.78 | 4.17 | — | — |
| Perb-E (phr) | — | — | — | — | 2.14 | 4.28 |
| m I/C | 1.13 | 1.69 | 0.59 | 0.71 | 1.20 | 2.39 |
| $YI_{film}$ | 24.3 | 0.24 | 45 | 43 | 34.1 | 20.4 |

Referring to Examples 8-9, for which same type of peroxide (i.e., dicumyl peroxide) were added during the preparation. It was observed that unexpectedly lower $YI_{film}$ values were resulted from polymeric compositions with higher m I/C ratio. This tendency can also be observed in Examples 10-11 and Examples 12-13, for which the type of peroxide added during the preparation were 2,5-dimethyl-2,5-di(tert-butylperoxy)hexane and t-butyl peroxy-2-ethyl-hexyl monocarbonate respectively. Therefore, a higher m I/C may be adopted in order to obtain a more preferable $YI_{film}$.

Example 14

100 parts by weight of UE3312, 2.85 parts by weight of H crosslinker, 1.67 parts by weight of DCP were added sequentially into a mixer (Brabender, Model: Plasti-Corder). After heating to 120° C., the mixing process was continued for 5 minutes at a rotational speed of 35 rpm until the polymeric composition was completely blended. Next, the polymeric composition was placed in a mold (of 0.4 mm thickness) and compressed at 2300 psi. Heat and compression were applied using a hydraulic compressor (Carver, Model: Monarch Series). The polymeric composition was left in the press for 15 minutes at a temperature of 180° C. Upon completion of the above procedure, the polymeric composition was then cooled down to room temperature and a film specimen with a consistent thickness was formed accordingly.

Examples 15-16

Examples 15-16 were performed in the same manner as in Example 1 except that the ingredients and contents of the polymeric material, crosslinking agent and radical initiator listed in Table 4 were substituted for those used in Example 14 to obtain film specimens. Next, the measurements of yellow index for Examples 15-16 were carried out, and the results are also shown in Table 4.

TABLE 4

|  | Ex. 14 | Ex. 15 | Ex. 16 |
|---|---|---|---|
| UE3312 (g) | 100 | 100 | 100 |
| H crosslinker (phr) | 2.85 | 4.28 | 6.42 |
| DCP (phr) | 1.67 | 2.497 | 3.735 |
| m I/C | 1.27 | 1.27 | 1.27 |
| I + C (phr) | 4.52 | 6.78 | 10.16 |
| $YI_{film}$ | 0.1 | 3.6 | 7.4 |

Note:
(i) m I/C refers to molar ratio (Initiator mole/crosslinking agent mole)
(ii) I + C refers to a total of initiator and M crosslinker or H crosslinker
(iii) $YI_{film}$ refers to the yellow index of the film specimen Referring to Examples 14-16, it was observed that polymeric compositions with lower I+C tend to provide lower $YI_{film}$ values. Therefore, a lower I+C may be adopted in order to obtain a more preferable $YI_{film}$.

Example 17

100 parts by weight of UE3312, 4.28 parts by weight of M crosslinker, 2.78 parts by weight of 101XL45 were added sequentially into a mixer (Brabender, Model: Plasti-Corder). After heating to 120° C., the mixing process was continued for 5 minutes at a rotational speed of 35 rpm until the polymeric composition was completely blended. Next, the polymeric composition was placed in a mold (of 0.4 mm thickness) and compressed at 2300 psi. Heat and compression were applied using a hydraulic compressor (Carver, Model: Monarch Series). The polymeric composition was left in the press for 15 minutes at a temperature of 180° C. Upon completion of the above procedure, the polymeric composition was then cooled down to room temperature and a film specimen with a consistent thickness was formed accordingly.

Examples 18-22

Examples 18-22 were performed in the same manner as in Example 1 except that the ingredients and contents of the polymeric material, specifier crosslinking agent and radical initiator listed in Table 5 were substituted for those used in Example 1 to obtain film specimens. Next, the reversibility of the film specimens was examined by placing in a mold (with 0.4 mm thickness) on the hydraulic compressor (Carver, Model: Monarch Series) and heating at a temperature of 230° C. under a pressure of 2300 psi for 15 minutes. The measurements of yellow index for Examples 17-22 after reverse heating process were carried out, and the results are also shown in Table 5.

TABLE 5

|  | Ex. 17 | Ex. 18 | Ex. 19 | Ex. 20 | Ex. 21 | Ex. 22 |
|---|---|---|---|---|---|---|
| UE3312 (g) | 100 | 100 | 100 | 100 | 100 | 100 |
| M crosslinker (phr) | 4.28 | — | 4.28 | — | 6.42 | — |
| H crosslinker (phr) | — | 4.28 | — | 4.28 | — | 6.42 |
| DCP (phr) | — | — | 3.33 | 3.33 | 3.33 | 3.33 |
| 101XL45 (phr) | 2.78 | 2.78 | — | — | — | — |

TABLE 5-continued

|  | Ex. 17 | Ex. 18 | Ex. 19 | Ex. 20 | Ex. 21 | Ex. 22 |
|---|---|---|---|---|---|---|
| m I/C | 0.58 | 0.59 | 1.66 | 1.69 | 1.11 | 1.13 |
| I + C (phr) | 7.06 | 7.06 | 7.61 | 7.61 | 9.75 | 9.75 |
| $YI_{film}$ | 50.6 | 46.5 | 14.3 | 6.2 | 43.6 | 36.9 |

Referring to Examples 17-18, in comparison to the polymeric composition produced from the addition of M crosslinker as the crosslinking agent (Example 17), with the same m I/C or I+C, the polymeric composition produced from the addition of H crosslinker as the crosslinking agent (Example 18) tend to provide a more preferable $YI_{film}$. This tendency can also be observed in Examples 19-22, in which the $YI_{film}$ of Example 20 is lower than that of Example 19, and the $YI_{film}$ of Example 22 is lower than that of Example 21.

(II) Viscosity

The viscosity was determined according to the following procedure and parameters using a dynamic shear rheometer (TA Instruments, Model: HR-1):

1. Conditioning Sample:
Temperature 100° C., Soak time 10 s.

2. Oscillation Temperature Ramp:
Start temperature 100° C.,
End temperature 170° C.,
Ramp rate: 30° C./min,
Strain 0.5%

3. Oscillation Time:
Temperature 170° C.
Duration: 1800 (sec).
Strain 0.5%

4. Oscillation Temperature Ramp:
Start temperature 170° C.,
End temperature 230° C.,
Ramp rate: 30° C./min,
Strain 0.5%

5. Oscillation Time:
Temperature 230° C.
Duration: 900 (sec).
Strain 0.5%

Example 23

100 parts by weight of UE3312, 4.28 parts by weight of M crosslinker and 3.33 parts by weight of DCP were added sequentially in a mixer (Brabender, Model: Plasti-Corder). After heating to 120° C., the mixing process was continued for 5 minutes at a rotational speed of 35 rpm until the resultant was completely blended. The polymeric composition was then cooled down to room temperature.

Examples 24-29

Figure 1:
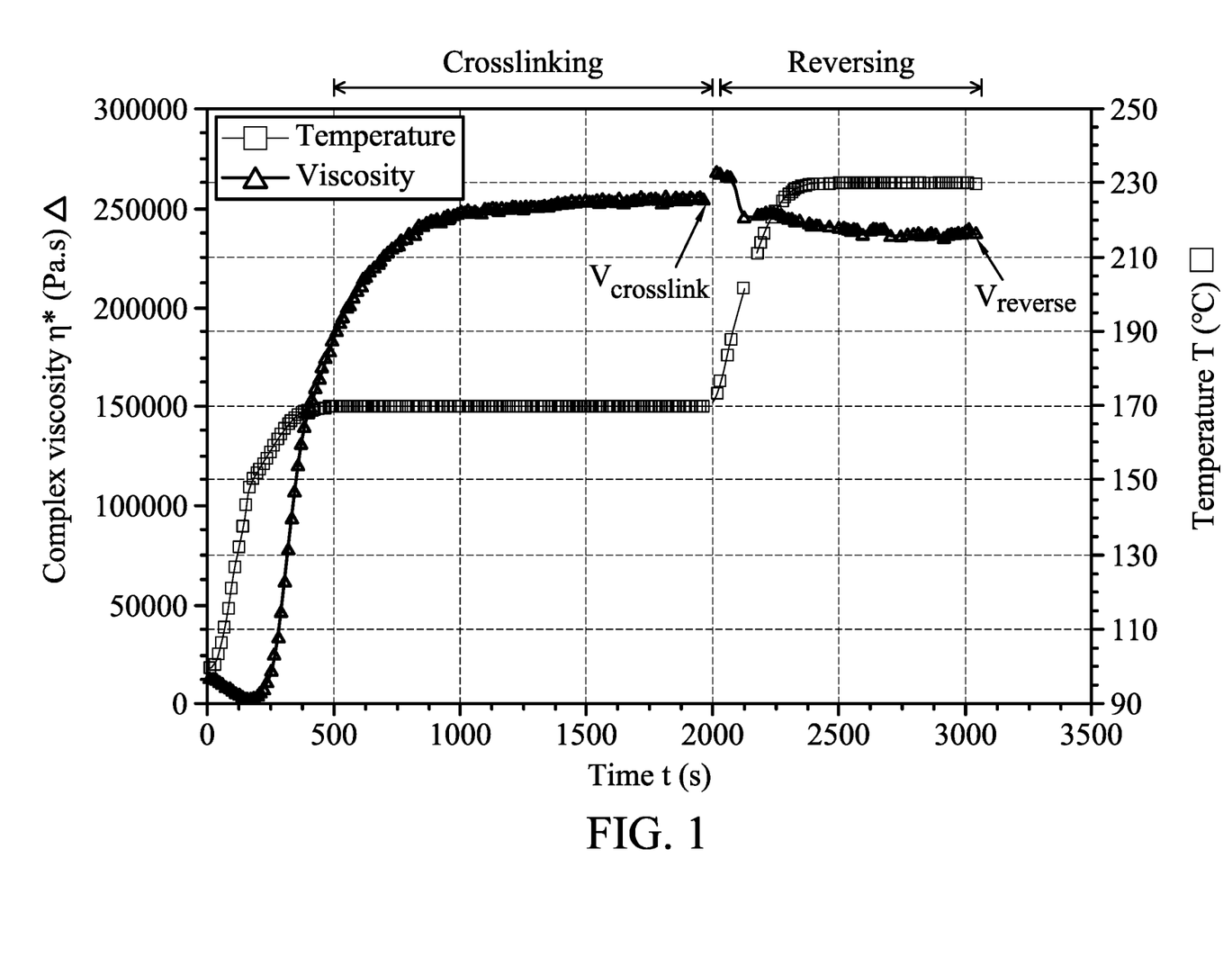
FIG. 1 is a schematic diagram of viscosity measurement at crosslinking process and reverse heating process for a polymeric composition produced without an addition of a crosslinking agent.
Figure 2:
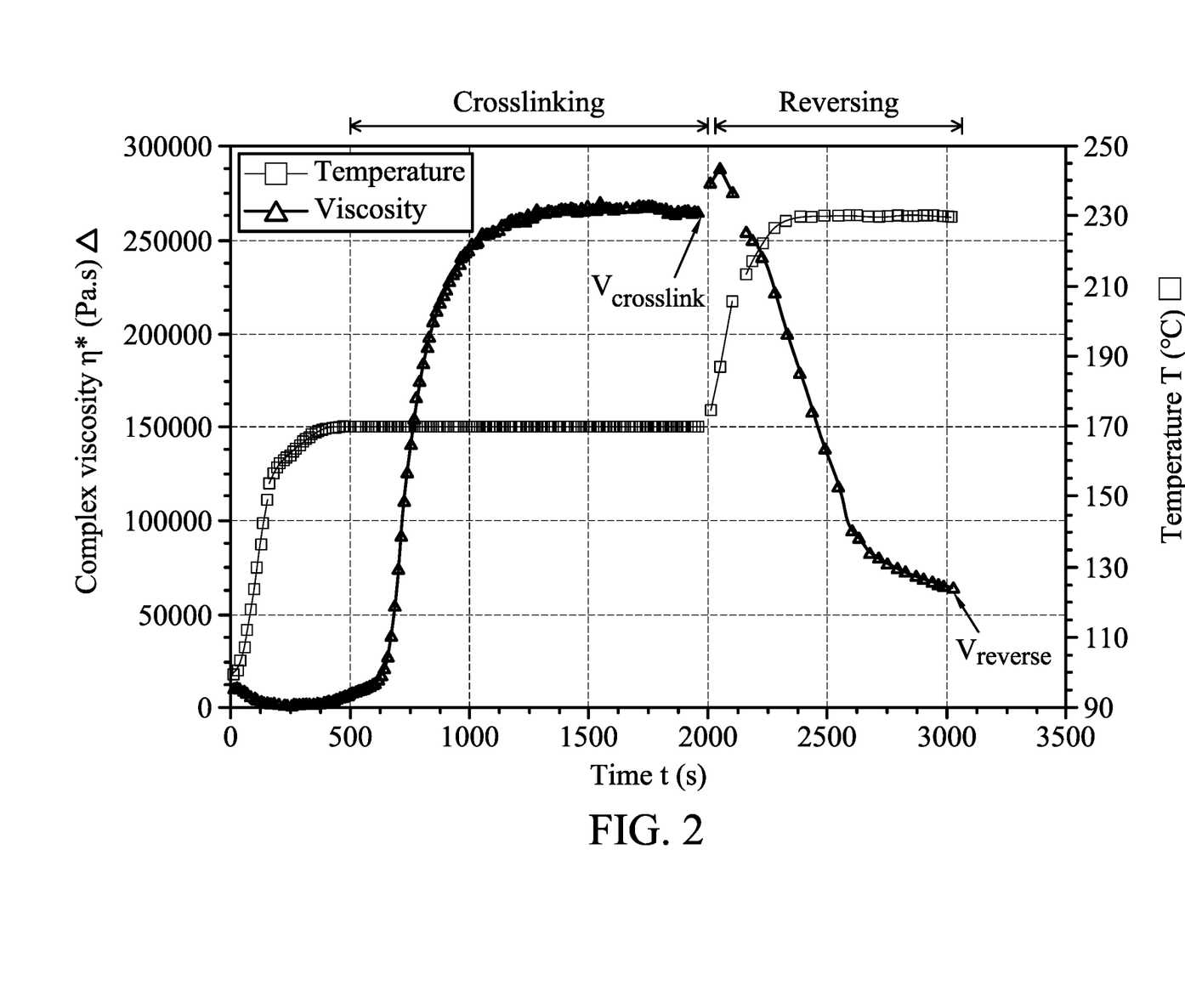
FIG. 2 is a schematic diagram of viscosity measurement at crosslinking process and reverse heating process for a polymeric composition produced with an addition of a crosslinking agent.

Examples 24-29 were performed in the same manner as in Example 23 except that the ingredients and contents of the polymeric material, crosslinking agent and radical initiator listed in Table 6 were substituted for those used in Example 23 to obtain the polymeric compositions. Next, as shown in FIGS. 1 and 2, the viscosity was determined after the crosslinking process and the reverse heating process of the polymeric composition, by heating the polymeric composition between parallel plates at 170° C. for 30 minutes and by heating the polymeric composition at 230° C. for 15 minutes respectively. The results are shown in Table 6.

TABLE 6

|  | Ex. 23 | Ex. 24 | Ex. 25 | Ex. 26 | Ex. 27 | Ex. 28 | Ex. 29 |
|---|---|---|---|---|---|---|---|
| UE3312 (g) | 100 | 100 | 100 | 100 | 100 | 100 | 100 |
| M crosslinker (phr) | 4.28 | — | 4.28 | — | 4.28 | — | — |
| H crosslinker (phr) | — | 4.28 | — | 4.28 | — | 4.28 | — |
| DCP (phr) | 3.33 | 3.33 | — | — | — | — | 0.7 |
| 101XL45 (phr) | — | — | 2.78 | 2.78 | — | — | — |
| Perb-E (phr) | — | — | — | — | 2.15 | 2.15 | — |
| m I/C | 1.66 | 1.69 | 0.58 | 0.59 | 1.18 | 1.20 | — |
| I + C (phr) | 7.61 | 7.61 | 7.06 | 7.06 | 6.43 | 6.42 | 0.7 |
| $V_{crosslink}$ (Pa·s) | 381617 | 285533 | 5009 | 6947 | 12660 | 2037 | 253920 |
| $V_{reverse}$ (Pa·s) | 164248 | 63163 | 181 | 207 | 177 | 152 | 237353 |

Note:
(i) $V_{crosslink}$ refers to the viscosity of the crosslinking process, which is determined at 170° C. for 30 minutes
(ii) $V_{reverse}$ refers to the viscosity of the reverse heating process, which is determined at 230° C. for 15 minutes Referring to the polymeric material produced with addition of a crosslinking agent (Examples 23-28), the $V_{crosslink}$ were in a range of 25000-400000 Pa·s. The $V_{reverse}$ of Examples 23-28 determined at 230° C. for 15 minutes were in a range of 150-180000 Pa·s, suggesting that the polymeric compositions are recyclable, regardless of the type of crosslinking agent added during the preparation of the polymeric composition. The term "recyclable" as used herein means that the viscosity of the polymeric composition is under 200000 Pa·s. In comparison, the polymeric material obtained without the addition of a crosslinking agent (Example 29) shows a $V_{reverse}$ over 200000 Pa·s, suggesting that the polymeric composition is not recyclable.

Example 30

100 parts by weight of UE629, 3.42 parts by weight of H crosslinker and 2.1 parts by weight of DCP were added sequentially in a mixer (Brabender, Model: Plasti-Corder). After heating to 120° C., the mixing process was continued for 5 minutes at a rotational speed of 35 rpm until the resultant was completely blended. The polymeric composition was then cooled down to room temperature.

Examples 31-35

Examples 31-35 were performed in the same manner as in Example 30 except that the ingredients and contents of the polymeric material, crosslinking agent and radical initiator listed in Table 7 were substituted for those used in Example 30 to obtain the polymeric composition. Next, the viscosity was determined after the crosslinking process and the reverse heating process of the polymeric compositions, by heating the polymeric compositions at a temperature of 170° C. for 30 minutes and by heating the polymeric compositions at a temperature of 230° C. for 15 minutes respectively. The results are shown in Table 7.

TABLE 7

| Sample | Ex. 30 | Ex. 31 | Ex. 32 | Ex. 33 | Ex. 34 | Ex. 35 |
| --- | --- | --- | --- | --- | --- | --- |
| UE629 (g) | 100 | — | — | — | — | — |
| NA112-27 (g) | — | 100 | — | — | — | — |
| LL120 (g) | — | — | 100 | — | — | — |
| Engage 8180 (g) | — | — | — | 100 | — | — |
| Engage 8003 (g) | — | — | — | — | 100 | 50 |
| UE659 (g) | — | — | — | — | — | 50 |
| H crosslinker (phr) | 3.42 | 3.42 | 3.42 | 3.42 | 3.42 | 3.42 |
| DCP (phr) | 2.1 | 2.1 | 2.1 | 2.1 | 2.1 | 2.1 |
| m I/C | 1.34 | 1.34 | 1.34 | 1.34 | 1.34 | 1.34 |
| I + C (phr) | 5.52 | 5.52 | 5.52 | 5.52 | 5.52 | 5.52 |
| $V_{crosslink}$ (Pa · s) | 29374 | 77982 | 242307 | 296349 | 220791 | 306018 |
| $V_{reverse}$ (Pa · s) | 1133 | 2924 | 4902 | 19341 | 5692 | 38093 |

Referring to Examples 30-35, the Vcrosslink were in a range of 25000-400000 Pa·s. The Vreverse of Example 30-35 were in a range of 1100-40000 Pa·s, this suggests that the polymeric compositions are crosslinkable and recyclable, regardless of the type of polymeric material used during the preparation of the polymeric composition, as long as the crosslinking agent is added.

Preparation of Recyclable Crosslinked Polymeric Foam

In accordance with some embodiments of the disclosure, the present polymeric foam may be prepared into a foam using a foaming process (e.g. a physical or chemical foaming process).

Table 8 lists the materials involved in the embodiments of the disclosure.

TABLE 8

| Product code | Category | Supplier | Ingredients |
| --- | --- | --- | --- |
| DCP | Radical Initiator | EMPEROR Chemical | Dicumyl peroxide |
| M crosslinker | Crosslinking agent | USI Corporation | 4,4'-diphenylmethane diisocyanate urethane bis-TEMPO |
| H crosslinker | Crosslinking agent | USI Corporation | 4,4'-diisocyanato dicyclohexylmethane urethane bis-TEMPO |
| ADC | Blowing agent | DongJin | Azodicarbonamide |
| ZnO | Additive | EMPEROR Chemical | Zinc oxide |
| UE659 | Polymeric material | USI Corporation | Ethylene-vinyl acetate copolymer |
| UE3312 | Polymeric material | USI Corporation | Ethylene-vinyl acetate copolymer |

Chemical Foaming Process

Example 36

100 parts by weight of UE659, 3.42 parts by weight of M crosslinker, 2 parts by weight of DCP, 1.9 parts by weight of BA, and 0.5 parts by weight of ZnO were added sequentially in a mixer (Brabender, Model: Plasti-Corder). After heating to 120° C., the mixing process was continued for 5 minutes at a rotational speed of 35 rpm until the polymeric composition was completely blended. Next, the polymeric composition was placed in a mold (with 0.3 mm thickness) and compressed at 2300 psi. Heat and compression were applied using a hydraulic compressor (Carver, Model: Monarch Series). The polymeric composition was left in the press for 12 minutes at a temperature of about 175° C. Upon completion of the above procedure, the polymeric composition was then cooled down to room temperature.

Example 37 and Example 38

Example 37 and Example 38 were performed in the same manner as in Example 36 except that the ingredients and contents of the polymeric material, crosslinking agent, radical initiator, blowing agent and additive listed in Table 9 were substituted for those used in Example 36 to obtain the foaming products. Next, the density and the cell size of the foaming products were measured. The foam density was measured by an electrical densimeter (MIRAGE, Model: ED-120T). The foam cell size was examined by a microscope (Nikon, Model: ECCIPSE CI). Finally, the re-processability of the foaming products was examined by placing the foaming products in a mold (with 0.4 mm thickness) on the hydraulic compressor (Carver, Model: Monarch Series) to heat at a temperature of 230° C. and a pressure of 2300 psi for 15 minutes, forming a thermoplastic reversed material.

The polymeric material used in Example 38 was recycled UE659, which was prepared as follows: the foaming product of Example 37 was sliced into small pieces and fed into the mixer with a rotational speed of 20 rpm at a temperature of 230° C., followed by a rotational speed of 35 rpm for 10 min. Then, the mixture was then cooled to temperature to form the recycled UE659.

TABLE 9

| Component | Example 36 | Example 37 | Example 38 |
|---|---|---|---|
| UE659 (g) | 100 | 100 | — |
| Recycled UE 659 (g) | — | — | 100 |
| M-crosslinker (phr) | 3.42 | — | — |
| H-crosslinker (phr) | — | 3.42 | 3.42 |
| DCP (phr) | 2 | 2 | 2 |
| BA (phr) | 1.9 | 1.9 | 1.9 |
| Additive (phr) | 0.5 | 0.5 | 0.5 |
| m I/C | 1.25 | 1.27 | 1.27 |
| I + C (phr) | 5.42 | 5.42 | 5.42 |
| Foam density | 0.18 | 0.18 | 0.21 |
| Cell Size (um) | 100-220 | 100-220 | 200-300 |

Note:
(i) m I/C refers to molar ratio (Initiator mole/crosslinking agent mole)
(ii) I + C refers to a total of Initiator and M crosslinker or H crosslinker.

The foaming product prepared with the addition of the crosslinking agent (Example 36, 37) shows a similar foaming structure with a cell size between 100 and 220 μm. In addition, the foaming product of prepared with a recycled polymeric material (Example 38) shows a foaming structure with a cell size between 200 and 300 μm. The densities of the foaming products of Example 36 and Example 37 sit within a range of 0.15 g/cm$^3$ to 0.23 g/cm$^3$, which is a typical density range for a midsole.

Furthermore, the yellow index ($YI_{foam}$) of Example 36 and Example 37 were measured. The $YI_{foam}$ is determined spectroscopically and visually. A standardized method is used to determine the yellow index based on ASTM E313 [D65/10] using a Colorimeter (HunterLab, Model: UltraScan VIS). YI is determined after processes of foaming and reverse heating. The results are shown in Table 10.

TABLE 10

| | Example 36 | Example 37 | Example 38 |
|---|---|---|---|
| $YI_{foam}$ (thickness: 0.65 mm) | 66.5 | 27 | 30.1 |
| $YI_{reversed\,film}$ (thickness: 0.30 mm) | 93.7 | 15.7 | 22.2 |

Note:
$YI_{foam}$ refers to the yellow index of the foaming products
Note:
$YI_{reversed\,film}$ refers to the yellow index of the thermoplastic reversed material From the results shown in Table 10, it was observed that in comparison to the foaming products produced from the addition of M crosslinker as the crosslinking agent (Example 36), the foaming products produced from the addition of H crosslinker as the crosslinking agent (Example 37) display a more preferable $YI_{foam}$, and its reverse material display a more preferable $YI_{reversed\,film}$. A low yellow index for the foaming product and the thermoplastic reversed material obtained therefrom is more ideal for the purpose to proceed further applications.

In some embodiments, taking the foaming product produced from the addition of H crosslinker as the crosslinking agent (Example 37) as an example, the foaming process can be carried out at a temperature of 170° C. to 195° C. for 6 to 15 minutes. The $YI_{foam}$ measured after foaming is between 27 and 29. The $YI_{reversed\,film}$ measured after reverse heating is between 15.5 and 17.5.

Moreover, it is worth noting that the foaming product prepared with recycled polymeric material (Example 38) also shows a $YI_{foam}$ of 30.1 and its reverse material shows a $YI_{reversed\,film}$ of 22.2. This allows the resulting foaming product and its thermoplastic reverse material to have an ideal white color.

Physical Foaming Process

Example 39

100 parts by weight of UE659, 3.42 parts by weight of H crosslinker, and 2.0 parts by weight of DCP were added sequentially in a mixer (Brabender, Model: Plasti-Corder). After heating to 120° C., the mixing process was continued for 5 minutes at a rotational speed of 35 rpm until the resultant was completely blended. The resultant was then placed in a mold (with 0.4 mm thickness) and compressed at 2300 psi. Heat and compression were applied using a hydraulic compressor (Carver, Model: Monarch Series). The resultant was left in the press to for 15 minutes at a temperature of about 175° C. Upon completion of the above procedure, the crosslinked specimen was then cooled down to room temperature. Next, the crosslinked specimen were placed in a tank of a supercritical fluid foaming system and the system temperature was adjusted to above 130° C. (not reaching a molten state). Nitrogen was then injected into the supercritical fluid foaming system and mixed with the crosslinked specimens. Next, the system pressure was adjusted to 150 bar to form a single-phase solution of the crosslinked specimen with the supercritical fluid of Nitrogen and maintain it for 2 hours. Then, the system pressure was adjusted to 1.013 bar within 1 second to obtain a foaming product.

Example 40

Example 40 were performed in the same manner as in Example 39, except that the polymeric material used in Example 39 was recycled UE659. Next, the density, cell size and yellow index ($YI_{foam}$) of the foaming products were measured. The foam density was measured by an electrical densimeter (MIRAGE, Model: ED-120T). The foam cell size was examined by a microscope (Nikon, Model: ECCIPSE CI). Finally, the recyclability of the foaming products was examined by placing the foaming products in a mold (with 0.4 mm thickness) on the hydraulic compressor (Carver, Model: Monarch Series) to heat at a temperature of 230° C. and a pressure of 2300 psi for 15 minutes.

The polymeric material used in Example 40 was recycled UE659, which was prepared as follows: the foaming product of Example 39 was sliced into small pieces and fed into the mixer with a rotational speed of 20 rpm at a temperature of 230° C., followed by a rotational speed of 35 rpm for 10 min. Then, the mixture was then cooled to temperature to form the recycled UE659.

TABLE 11

| Component | Example 39 | Example 40 |
|---|---|---|
| UE659 (g) | 100 | — |
| Recycled UE659 | — | 100 |
| M crosslinker (phr) | — | — |
| H crosslinker (phr) | 3.42 | 3.42 |
| DCP (phr) | 2.0 | 2.0 |
| m I/C | 1.27 | 1.27 |
| I + C (phr) | 5.42 | 5.42 |
| $YI_{foam}$ | 10.53 | 27.3 |

TABLE 11-continued

| Component | Example 39 | Example 40 |
|---|---|---|
| $YI_{reversed\,film}$ | 41.2 | 40.5 |
| Foam density | 0.18 | 0.18 |
| Cell Size (um) | 100-150 | 200-400 |

From the results shown in Table 11, it is worth noting that the foaming product prepared with recycled polymeric material (Example 40) shows a YI foam of 27.3 and its reverse material shows a YI reversed film of 40.5. A YI value lower than 45 allows the resulting foaming product and its reverse material to have an ideal white color.

The foaming product of Example 39 display a foaming structure with a cell size between 100 and 150 μm, whereas the foaming product of Example 40 has a cell size between 200 and 400 μm. The densities of the foaming products of Example 39 and Example 40 sit within a range of 0.15 g/cm$^3$ to 0.23 g/cm$^3$, which is a typical density range for a midsole.

In accordance with some embodiments of the disclosure, when the foam is formed by a physical foaming process, a supercritical fluid or a physical foaming agent may be used for foaming. The supercritical fluid may be carbon dioxide, nitrogen, or a combination thereof. The physical foaming agent may be water, methane, ethane, butane, propane, pentane, hexane, ethylene, propylene, methanol, ethanol, acetone, air, or a combination thereof.

In this disclosure, the resulting recyclable crosslinked polymeric foam is environmentally and economically sustainable. Upon a foaming process (e.g. a physical or chemical foaming process), by applying specific types of crosslinking agent (in which the H crosslinker is particularly preferred), and by controlling a certain ratio between the proportion of the radical initiator, the crosslinking agent and the polymeric material, desirable physical properties such as unexpectedly low yellow index for the polymeric and its reversed material can be achieved, which allows flexibilities for further applications such as dyeable substrates, footwear, athletic equipment, and furniture.

While the disclosure has been described by way of example and in terms of preferred embodiment, it is to be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A recyclable crosslinked polymeric foam, comprising a reaction product of:
   100 parts by weight of a polymeric material;
   from 0.1 to 10 parts by weight of a crosslinking agent, wherein the crosslinking agent comprises 4,4'-diisocyanato dicyclohexylmethane urethane bis-TEMPO; and
   from 0.1 to 5 parts by weight of a radical initiator.

2. The recyclable crosslinked polymeric foam of claim 1, wherein the polymeric material is an ethylene-based polymer, a polyolefin polymer, a polyethylene polymer, a propylene polymer, a styrene polymer, an ethylene-propylene-diene (EPDM) rubber, a natural rubber (NR), an isopropylene rubber (IR), a copolymer thereof, or a combination thereof.

3. The recyclable crosslinked polymeric foam of claim 1, wherein the polymeric material has a vinyl acetate content of 3 to 45% by weight and a melt index of 0.01 to 400 g/10 min.

4. The recyclable crosslinked polymeric foam of claim 1, wherein the radical initiator comprises peroxide.

5. The recyclable crosslinked polymeric foam of claim 4, wherein the peroxide is dicumyl peroxide or bis-(tert-butylperoxy isopropyl) benzene peroxide (BIBP).

6. The recyclable crosslinked polymeric foam of claim 1, wherein the recyclable crosslinked polymeric foam is a foaming product of a chemical foaming process.

7. The recyclable crosslinked polymeric foam of claim 6, wherein the chemical foaming process comprises using a blowing agent, wherein the blowing agent comprises an azo compound or a hydrazide compound.

8. The recyclable crosslinked polymeric foam of claim 7, wherein the azo compound is 2,2'-azobis(2-cyanobutane), 2,2'-azobis(methylbutyronitrile), or azodicarbonamide.

9. The recyclable crosslinked polymeric foam of claim 7, wherein the hydrazide compound is p,p'-oxybis(benzene sulfonyl hydrazide), p-toluene sulfonyl semicarbazide, or p-toluene sulfonyl hydrazide.

10. The recyclable crosslinked polymeric foam of claim 1, wherein the recyclable crosslinked polymeric foam is a foaming product of a physical foaming process.

11. The recyclable crosslinked polymeric foam of claim 1, wherein a molar ratio of the radical initiator and the crosslinking agent is from 0.1 to 5.

12. The recyclable crosslinked polymeric foam of claim 1, wherein a total of the radical initiator and the crosslinking agent is 0.5 to 15 parts by weight, based on 100 parts. by weight of the polymeric material.

13. The recyclable crosslinked polymeric foam of claim 1, wherein a density of the recyclable crosslinked polymeric foam is in a range of 0.05 g/cm$^3$ to 0.8 g/cm$^3$.

14. The recyclable crosslinked polymeric foam of claim 1, wherein a foam cell size of the recyclable crosslinked polymeric foam is between 30 μm and 1 mm.

15. A reusable footwear component comprising the recyclable crosslinked polymeric foam of claim 1, wherein a yellow index of the recyclable crosslinked polymeric foam is between −5 and 70.

16. The reusable footwear component of claim 15, wherein the reusable footwear component comprises an insole, a midsole or an outsole.

17. A reversed material obtained from the reusable footwear component of claim 15, wherein a yellow index of the reversed material is between −5 and 95.

18. The reversed material obtained from the reusable footwear component of claim 17, wherein the yellow index of the reversed material is between −5 and 45.

* * * * *